No. 616,454. Patented Dec. 27, 1898.
D. E. DARNELL.
CATTLE STANCHION.
(Application filed Apr. 14, 1898.)
(No Model.)
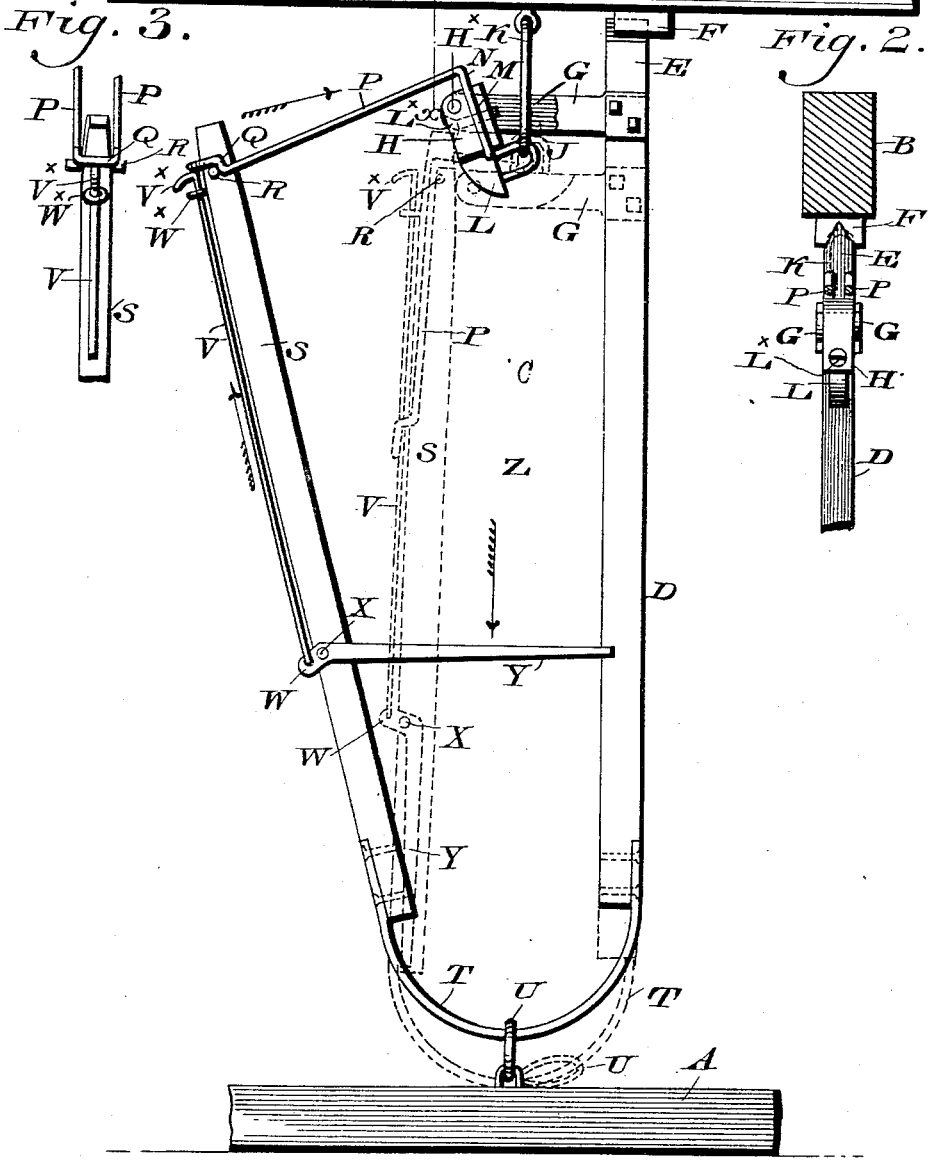

UNITED STATES PATENT OFFICE.

DAVID E. DARNELL, OF MOORESTOWN, NEW JERSEY.

CATTLE-STANCHION.

SPECIFICATION forming part of Letters Patent No. 616,454, dated December 27, 1898.

Application filed April 14, 1898. Serial No. 677,594. (No model.)

*To all whom it may concern:*

Be it known that I, DAVID E. DARNELL, a citizen of the United States, residing at Moorestown, in the county of Burlington, State of New Jersey, have invented a new and useful Improvement in Cattle-Stanchions, which improvement is fully set forth in the following specification and accompanying claims.

My invention consists of an improved construction of a cattle-stanchion which is movably secured at its upper and lower ends, provision being made for automatically closing and locking the same after the animal has passed its head therethrough, and means being provided whereby the stanchion can in a measure freely conform to the movement of the animal, thus adding to the ease and comfort thereof, as in stanchions of the usual construction.
It further consists of an improved device for holding the stanchion in closed and open condition.

It further consists of novel details of construction, all as will be hereinafter fully set forth, and specifically pointed out in the claims.

Figure 1 represents a side elevation, partly in section, of a cattle-stanchion embodying my invention. Fig. 2 represents a section on line $x\ x$, Fig. 1. Fig. 3 represents an end of the movable bar of the stanchion, showing the bail and tripping device therefor.

Similar letters of reference indicate corresponding parts in the figures.
Referring to the drawings, A and B designate the lower and upper beams of a frame, to which the stanchion C is movably attached, the same consisting of the upright bars D and S, the bar D being provided with a tongue E, the latter being adapted to enter and engage with the keeper F when the stanchion is in the position indicated in open condition, as shown in full lines in Fig. 1.

G designates laterally-extending arms attached to the bar D and having the head H pivotally mounted thereon, as at $H^\times$, said head carrying the eye J, which being eccentric on said head is hung on the link or hanger K, the latter being suitably secured to the upper beam B. The head is preferably made in two sections L and M, which are secured together in any suitable manner, as by the screw $L^\times$.

P designates a bail whose limb or portion N is secured to the head H, said bail having near the outer end thereof the shoulders Q, which are adapted to engage with the pins or projections R on the upper portions of the movable bar S. The lower extremities of the bars D and S have connected with them the resilient strip or spring T, which passes through the freely-swinging link or ring U, which is secured to the lower beam A.

V designates a rod or detent located on the bar S and having at its top the curved or other shaped head $V^\times$, said bar being guided in the staple or similar device $W^\times$ on said bar S, its lower portion engaging the limb W of the lever or trigger Y, which latter is fulcrumed to the bar S at the point X.

The operation is as follows: Before the animal has placed its head in the stanchion the parts are placed in the position indicated in full lines in Fig. 1, it being noted that as the stanchion is opened the eye J turns downwardly, thus, owing to the elevation of the axial end of the head H, raising the stanchion, whereby the latter is locked with the beam B by reason of the entrance and engagement of the tongue E into and with the keeper F, so that turning of the stanchion is prevented, it being further apparent that the weight of the stanchion is supported by means of the hanger K, and thus an upward pull is exerted upon the bail P at the eye J, so that the shoulders Q will firmly bear against the pins R, the closing tendency of the spring T also serving to increase such action. When the animal enters the stall, it passes its head into the space Z, and when it lowers the same to reach the feed ordinarily placed below the lever Y the latter will be depressed, whereupon the detent V will move upwardly and the bail P will be lifted out of engagement with the pins R and the resiliency of the spring T will cause the bars D and S to close, the bail P folding on the bar S. (Both shown in dotted lines, Fig. 1.) The bars S and D now lower, so that the tongue E removes from the keeper F and the stanchion will then be free to move with the movement of the animal, as is evident, but the bars remain closed, owing to the engagement of the bail P with the pins R, as also shown in dotted lines, Fig. 1.

The resilient spring or strip T has both of its ends rigidly secured to the bars D and S, so that it not only connects the base of said bars, but provides the means for automatically closing said bars when the releasing mechanism is tripped by the animal.

When it is desired to release the animal, it is only necessary to turn the bail P and move the bar S from the bar D, when the base engages with the pins R and retains the stanchion in open position.

Having thus described my invention, what I claim as new, and desire to secure by Letters Patent, is—

1. In a cattle-stanchion, a plurality of upright bars joined at their lower portion by a resilient strip, a head pivotally supported from one of said bars, supporting devices for said stanchion attached to said head, means attached to said head for holding the upper portions of said bars apart and tripping devices actuated by the animal for permitting said upper portions to move toward each other, said strip having both ends rigidly secured to said bars as the base thereof, and providing the spring for closing the bars when released.

2. In a cattle-stanchion, the combination of bars, a resilient piece joining the lower portions thereof, a tongue on the upper end of one of said bars, a keeper on an overhead support for said tongue, an arm projecting from one of said bars, a pivotal head mounted on said arm, an eye eccentric on said head, a suspension device common to said eye and support, a bail on said head adapted to engage the free end of the opposite bar and having a shoulder thereon, adapted to engage with a projection on said bar, and a tripping device for said bail.

3. In a cattle-stanchion, the combination of a plurality of upright bars joined at their lower portion by a resilient strip or spring, an arm extending from one of said bars, a head pivotally mounted on said arm, means for supporting the weight of said stanchion upon said head, a bail attached to the latter and interlocking devices common to said bail and the adjacent bar.

4. In a cattle-stanchion, upright bars joined at their lower portion by a resilient strip, one of said bars having an extension, a keeper engaged by said extension and projecting from one of said bars, a head pivotally mounted on one of said bars, an eye on said head, means for supporting the stanchion from said eye, a bail attached to said head and having a shoulder thereon engaging a projection on the adjacent bar and means for disengaging said bail from said projection.

5. In a cattle-stanchion, upright bars, a resilient piece connecting the lower ends thereof and adapted to close the bars, means for raising said bars, an overhead keeper with which one of said bars engages when raised and a swinging link connected with a base and freely embracing said resilient piece.

6. In a cattle-stanchion, upright bars, a piece of resilient material connecting the same, an eye, a head carrying said eye and being pivotally connected with one of said bars, a keeper on an overhead frame receiving a tongue of said bar, a locking device attached to said head and adapted to engage the other bar, and links attached to said frame and a base-frame, the upper link being secured to said eye and the lower link freely receiving said resilient piece.

7. In a cattle-stanchion, bars and a resilient piece joining the same, a head pivotally mounted on one of said bars, an eye on said head, a flexible hanger with which said eye is connected, and a bail secured to said head adapted to engage with the opposite bar for holding the stanchion open, and means for releasing said bail to permit said resilient piece to close the stanchion, said eyes being eccentric on said head.

DAVID E. DARNELL.

Witnesses:
  WM. C. WIEDERSHEIM,
  E. HAYWARD FAIRBANKS.